United States Patent
Boyce

[19]

[11] Patent Number: 5,870,969
[45] Date of Patent: Feb. 16, 1999

[54] FEED CONTAINER WITH SLIDING COVER LID AND CREEP FEEDER CAGE

[76] Inventor: Trent Boyce, 315 N. 3500 E., Lewisville, Id. 83431

[21] Appl. No.: 735,702

[22] Filed: Oct. 23, 1996

[51] Int. Cl.[6] ....................................................... A01K 5/01
[52] U.S. Cl. .............................. 119/61; 119/51.5; 220/481
[58] Field of Search ................................ 119/51.5, 61, 63, 119/71, 475, 477, 464, 257, 51.03; 220/480, 481, 737, 212, 360, 367.1, 346

[56] References Cited

U.S. PATENT DOCUMENTS

| | | | |
|---|---|---|---|
| D. 118,124 | 12/1939 | MacLean | 119/51.03 |
| D. 217,472 | 5/1970 | Lovitz . | |
| 485,328 | 11/1892 | Lee | 119/51.03 |
| 590,458 | 9/1897 | Lee | 119/51.03 |
| 1,349,051 | 8/1920 | Dulac | 248/103 |
| 1,385,510 | 7/1921 | Ward | 119/71 |
| 1,407,681 | 1/1922 | Saunders | 248/103 |
| 1,798,984 | 3/1931 | Petersen | 119/61 |
| 2,074,736 | 3/1937 | Whitten | 248/103 |
| 2,267,062 | 12/1941 | Walter et al. | 119/51.03 |
| 2,391,264 | 12/1945 | Nickelson | 248/103 |
| 2,457,972 | 1/1949 | Bailey | 248/103 |
| 2,514,134 | 7/1950 | Mann | 248/102 |
| 2,575,056 | 11/1951 | Jones | 248/103 |
| 2,595,752 | 5/1952 | Batts | 220/481 X |
| 2,670,165 | 2/1954 | Dominguez | 248/103 |
| 2,888,971 | 6/1959 | Wootton | 248/214 |
| 2,972,979 | 2/1961 | Struck | 119/51.5 |
| 3,983,976 | 10/1976 | Taylor | 220/481 X |
| 4,011,951 | 3/1977 | Boyer | 119/51.5 X |
| 4,798,170 | 1/1989 | DePiazzy | 119/61 |
| 4,946,057 | 8/1990 | Connolly et al. | 220/481 |
| 4,979,707 | 12/1990 | McErlean | 248/104 |
| 5,010,847 | 4/1991 | Braden | 119/475 |
| 5,090,358 | 2/1992 | Waldman | 119/257 |
| 5,114,108 | 5/1992 | Olschansky | 248/311.2 |
| 5,301,634 | 4/1994 | Ho | 119/477 |

FOREIGN PATENT DOCUMENTS

| | | | |
|---|---|---|---|
| 49820 | 12/1931 | Norway | 119/61 |
| 14340 | 8/1891 | United Kingdom | 220/480 |

*Primary Examiner*—Michael J. Carone
*Assistant Examiner*—Elizabeth Shaw
*Attorney, Agent, or Firm*—Thorpe, North & Western, LLP

[57] ABSTRACT

A feeding apparatus for feeding livestock. The apparatus includes a feed container having an upper opening. The container has two projecting lips extending along portions of a perimeter surrounding the upper opening. A sliding cover has two retaining channels formed thereon. The projecting lips of the container are configured to slidably engage within the retaining channels of the cover in an interlocking configuration to prevent removal of the cover other than by sliding. The cover may be a solid lid member or a creep feeder cage having passages formed therein. A pair of blocking tabs are secured to the cover at proximal ends of the projecting lips to block the cover from sliding beyond a closed position.

52 Claims, 3 Drawing Sheets

FEED CONTAINER WITH SLIDING COVER LID AND CREEP FEEDER CAGE

BACKGROUND OF THE INVENTION

1. The Field of the Invention

The present invention relates generally to feed containers. More particularly, it concerns a mountable livestock feed container having a slidable cover lid and creep feeder cage.

2. The Background Art

The livestock industry has sought the development of efficient feeding devices and methods. In particular, calves, horses and other livestock have been fed pellets, grains and hay in conventional dry feeding buckets, and liquids such as milk or water in conventional wet feeding buckets.

There is a need in the field of livestock feed buckets to selectively restrict access to the contained feed to young animals only, or to restrict access to the feed by all animals, with a minimum of time and effort. Resiliency of the feed container to bunting motions by livestock is also needed. Prior art feed containers are rigid in material and in attachment to their support structure. Lids and creep feeder cages have been designed for restricting access to the feed but are either too easily bunted off by the livestock, or require too much time and effort to secure.

There is also a need for convenient attachment and replacement structure to permit fast, efficient removal and replacement of the feed container. Many prior art feed containers are held in place by a rigid, circumscribing ring, or are nailed or wired to a support.

It is also common practice in the livestock industry to transport feed containers which contain feed. The feed can be jostled about and thrown from the containers during transport. It would be desirable to transport portable animal carriers without having to remove the feed from the containers or the containers from the carriers.

Unfortunately, the prior art feed buckets are characterized by a number of disadvantages. They are rigid in structure and are often rigidly secured to the wall of a stall, and thus insufficiently resilient to bunting. The container lid or creep feeder cage often cannot withstand bunting from the livestock and becomes knocked off.

OBJECTS AND SUMMARY OF THE INVENTION

It is therefore an object of the present invention to provide a feed container which is simple in design and manufacture.

It is another object of the present invention, in accordance with one aspect thereof, to provide a feed container which is more easily attachable to and removable from a support structure.

It is a further object of the invention to provide a feed container with a slidably interlocking cover member which is blocked from sliding beyond a closed position.

It is an additional object of the invention, in accordance with one aspect thereof, to provide such a feed bucket which has elastic memory.

It is yet another object of the invention, in accordance with one aspect thereof, to provide such a feed bucket which is easier for animals to lick clean.

The above objects and others not specifically recited are realized in a specific illustrative embodiment of a feeding apparatus for feeding livestock. The apparatus includes a feed container having an upper opening. The container has two projecting lips extending along portions of a perimeter surrounding the upper opening. A sliding cover has two retaining channels formed thereon. The projecting lips of the container are configured to slidably engage within the retaining channels of the cover in an interlocking configuration to prevent removal of the cover other than by sliding. The cover may be a solid lid member or a creep feeder cage having passages formed therein. A pair of blocking tabs are secured to the cover at proximal ends of the projecting lips to block the cover from sliding beyond a closed position.

Additional objects and advantages of the invention will be set forth in the description which follows, and in part will be apparent from the description, or may be learned by the practice of the invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF PRESENTLY PREFERRED EMBODIMENTS

Figure 1:
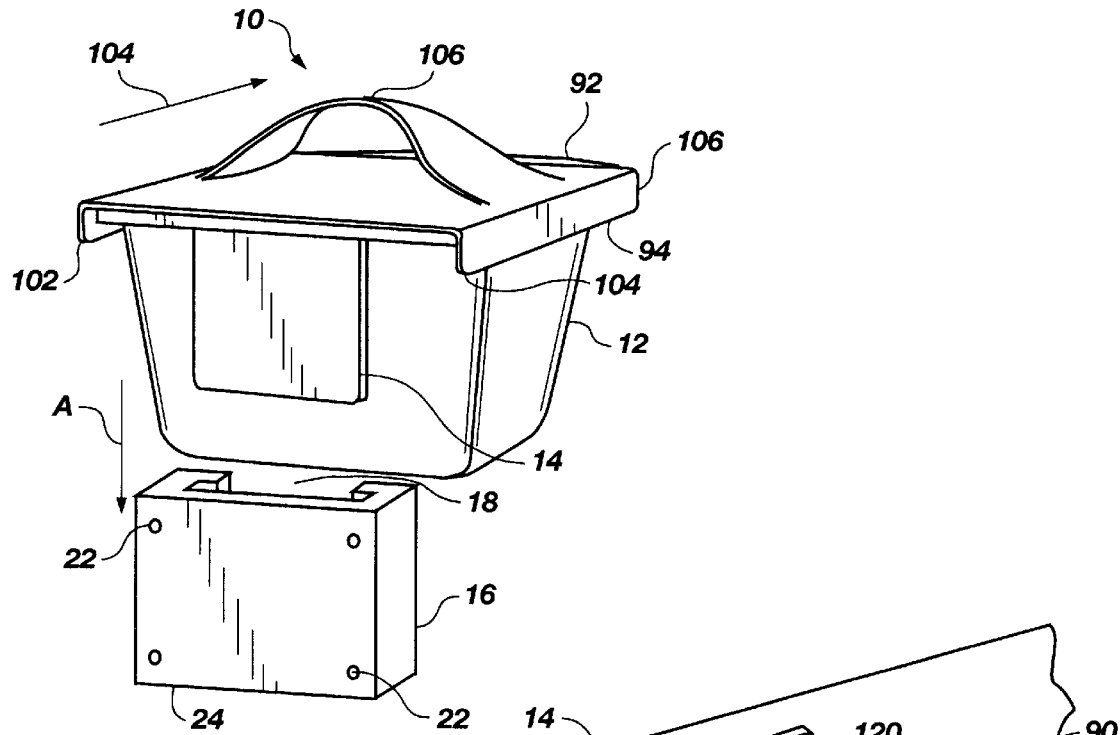
FIG. 1 is a rear perspective view of a feed container made in accordance with the principles of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated device, and any additional applications of the principles of the invention as illustrated herein, which would normally occur to one skilled in the relevant art and possessed of this disclosure, are to be considered within the scope of the invention claimed.

Referring now to FIG. 1, there is shown a feeding apparatus, generally designated at 10. The apparatus 10 includes feed support means, such as feed container 12, for supporting edible items. An insert means 14 is coupled to the feed container 12, the container 12 extending laterally outward from the insert means 14 in an at least partially cantilevered position as shown.

Figure 2:
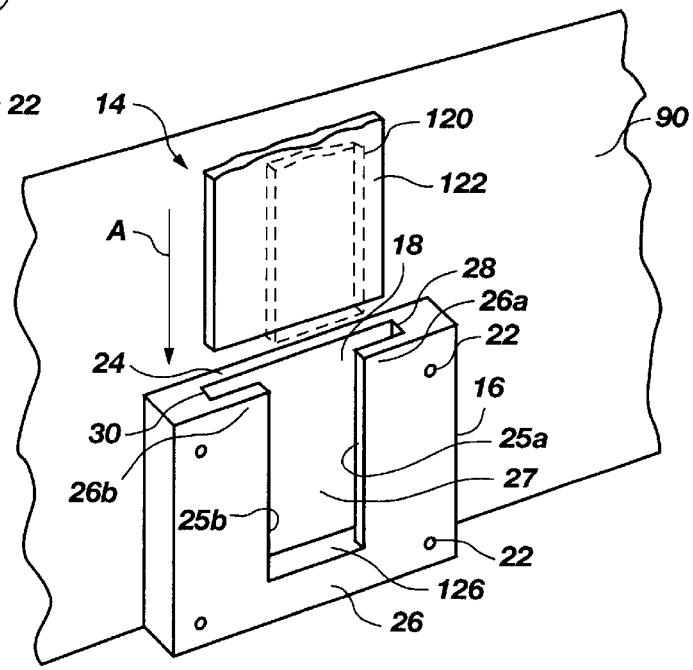
FIG. 2 is a perspective view of mounting structure of the feed container of FIG. 1.

In FIGS. 1–2 is shown a mounting bracket 16 having a receiving space 18 defined by sidewalls, said mounting bracket 16 including attachment means for attaching to a support member, such as screw holes 22. More particularly, the mounting bracket 16 includes first and second, substantially parallel sides 24 and 26, said sides being spaced apart, and first and second spaced-apart spacing walls 28 and 30 residing between the first and second sides 24 and 26, such that the sides and spacing walls cooperatively define the receiving space 18.

The insert means 14 is configured and dimensioned for (i) slidably inserting into the receiving space 18 of the mounting bracket 16, (ii) engaging against the sidewalls 24 and 26 defining the receiving space 18, and (iii) supporting the feed support means 12 in hanging suspension from the mounting bracket 16. The mounting bracket 16 may alternatively be described as a support plate 24, wherein the second side 26 has an opening 27 formed therein and thereby constitutes first and second retaining flanges 26a and 26b which, together with the spacing walls 28 and 30, form L-shaped cross-sections as shown which extend outwardly from the support plate 24.

It is therefore to be understood that the phrase "second side" as used herein shall be construed broadly to cover either a solid, continuous wall with no opening or a discontinuous wall having a centrally-formed opening, such as second side 26 having opening 27 formed therein, even a wall comprised of two or more unconnected sections. As such, two or more unconnected pieces disposed in alignment so as to be common to a single plane, symmetrical curve or rectangle may nonetheless constitute a single "second side" as that phrase is intended herein, and as illustrated by the upper portion of second side 26.

Accordingly, the second side of the mounting bracket 16 may alternatively be described to include an opening 27 formed therein such that the second side forms a discontinuous member comprising the first and second retaining flanges 26a and 26b extending toward one another from the spacing walls 28 and 30. The mounting bracket 16 thus comprises a means for circumscribing a majority of the insert means 14, when the insert means 14 is inserted into the receiving space 18 as indicated by arrow A in FIGS. 1 and 2. The insert means 14 preferably comprises a substantially flat, planer member which is preferably rectangular, and the receiving space 18 is preferably characterized by a rectangular shape.

Figure 2A:
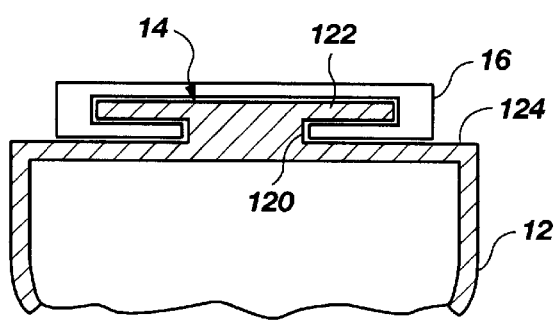
FIG. 2A is a top, partially cross-sectional view of the mounting structure of FIG. 2.

Referring now to FIGS. 2 and 2A, a preferred embodiment of the insert means 14 will now be described. FIG. 2 illustrates a connecting member 120 shown in phantom line as an optional but preferred part of the insert means 14. In this embodiment, the insert means 14 would comprise a planer member 122 and a connecting member 120 coupled to the planer member 122 and being narrower than said planer member. As shown in FIG. 2A, the connecting member 120 is sandwiched between the planer member 122 and the feed support means container 12.

More specifically, the feed container 12 comprises an outer wall 124, and the connecting member 120 is sandwiched between the planer member 122 and said outer wall 124 such that said planer member 122, connecting member 120 and outer wall 124 collectively comprise an I-shaped cross section as shown in FIG. 2A. The planer member 122 and outer wall 124 would, in cross section, form the flanges of the "I" shape even though they are not necessarily of equal length as in FIG. 2A.

The mounting bracket 16 further comprises a lower support surface 126, as shown in FIG. 2, defining a lowermost boundary of the receiving space 18. The lower support surface 126 is disposed in alignment with the planer member 122 and the connecting member 120 of the insert means 14 when said insert means is slidably inserted into the receiving space 18. Preferably, the planer member 122 and connecting member 120 reside in abutting contact against the lower support surface 126 of the mounting bracket when inserted into the receiving space 18, such that the insert means 14 comprises means for abutting against said lower support surface 126.

The first and second retaining flanges 26a and 26b respectively comprise first and second terminal edges 25a and 25b. Preferably, the connecting member 122 is substantially as wide as the opening 27 formed in the second side 26 of the mounting bracket 16 such that said connecting member 122 is disposed in abutting contact with said first and second terminal edges 25a and 25b of the retaining flanges 26a and 26b when the insert means 14 is slidably inserted into the receiving space 18.

Figure 3:
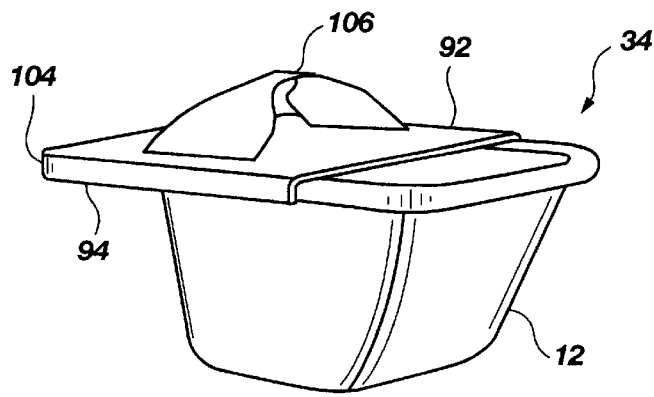
FIG. 3 is a front perspective view of the feed container of FIG. 1.
Figure 7:
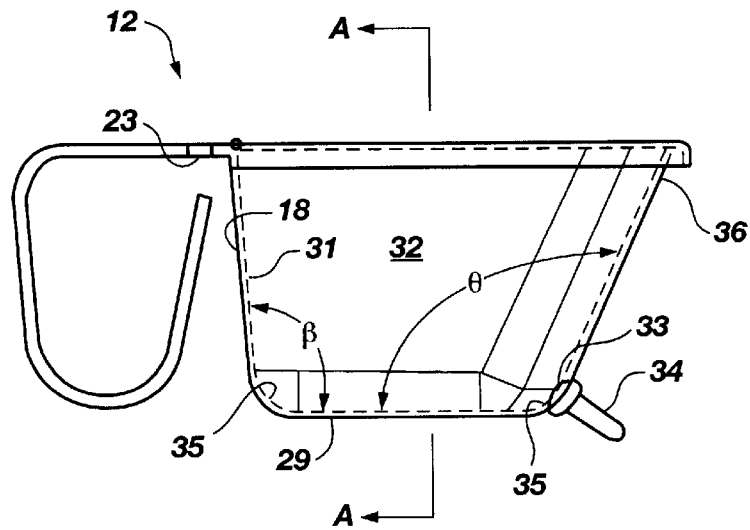
FIG. 7 is an alternative embodiment of the feed container of FIGS. 1 and 3, in the form of a resilient feed bucket including an optional nipple member disposed thereon.
Figure 8:
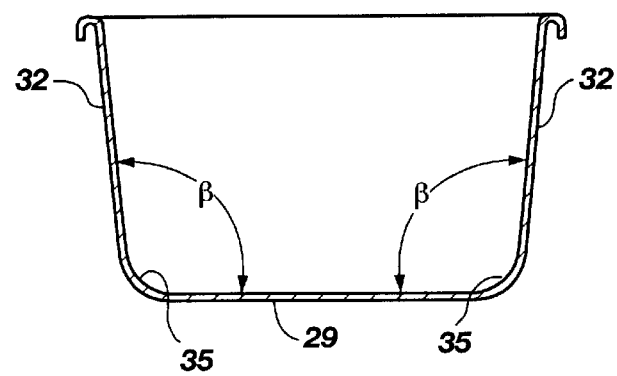
FIG. 8 is a cross-sectional view of the feed bucket of FIG. 7, taken along section A—A.

The feed support means 12 preferably comprises a feed container having an upper opening 34 as shown most clearly in FIG. 3. Referring now to FIGS. 7–8, there is shown a preferred embodiment of the feed container 12 with presently preferred design dimensions expressed in inches. It is seen that the feed container 12 includes a bottom wall 29. A rear wall 31 and side walls 32 extend upwardly from the bottom wall 29. The rear wall 31 and side walls 32 preferably define an obtuse angle $\beta$ relative to the bottom wall 29, as shown in FIGS. 7–8. The obtuse angle $\beta$ preferably is preferably within a range of approximately 91 degrees to 120 degrees and most preferably within a range of approximately 91 degrees to 100 degrees.

The feeding apparatus 10 further comprises a front wall 36 extending upwardly from the bottom wall 29. The front wall 36 preferably defines at an obtuse angle $\theta$ relative to the bottom wall 29, as shown in FIG. 7. The obtuse angle $\theta$ is preferably within a range of approximately 91 degrees to 150 degrees, and most preferably within a range of approximately 105 degrees to 120 degrees. It is noted that the container 12 is preferably formed as a single, unitary member made of resilient plastic material.

It will be appreciated that animals desire to lick out their feed buckets, and substantially vertical walls as in conventional feed buckets inhibit the animals' ability to lick out the bottom and the corners of the bucket. The angled front wall 36 enhances the ease by which an animal can access food items contained in the feed container 12, especially when combined with the angled side walls 32 and angled rear wall 31. It is also preferred that the bottom wall 29 forms rounded corner sections 35 with the rear wall 31, side walls 32 and front wall 36 as shown in FIGS. 7–8, which further enhances the animals' ability to lick the feed container 12 clean.

Any of the walls 31, 32 or 36 may optionally include an opening 33 formed therein and the feeding apparatus may include dispensing means 34 disposed in communication with the opening 33 for dispensing the edible items (not shown) from the feed container 15. The opening 33 is preferably formed in the front wall 36. The dispensing means 34 may comprise a flexible nipple member as shown in FIG. 2, especially when the edible food items comprise milk, water or electrolyte solution.

Figure 6:
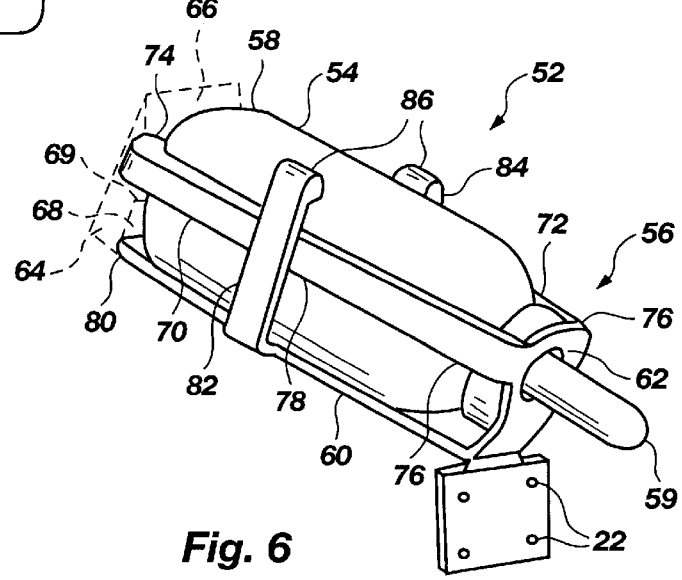
FIG. 6 is an alternative embodiment of the feed container of FIGS. 1 and 3, in the form of a resilient bottle holder including an optional nipple member disposed thereon.
Figure 9:
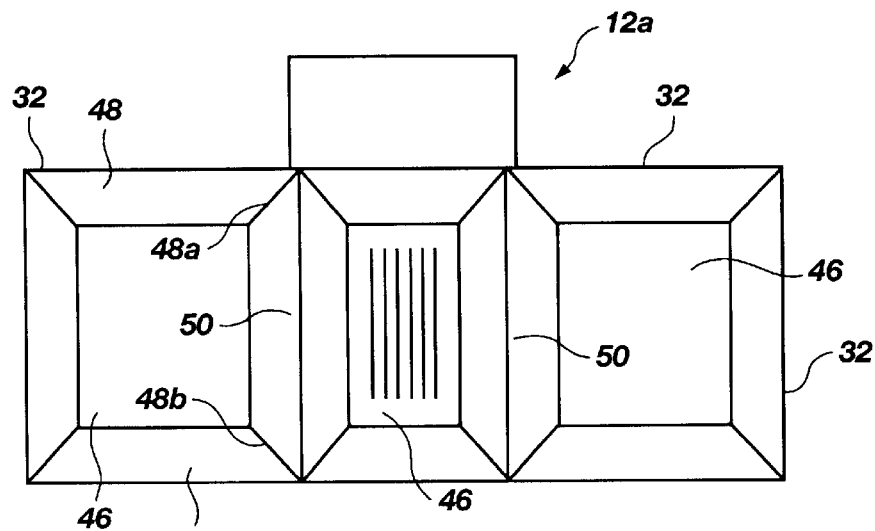
FIG. 9 is an alternative embodiment of the feed bucket of FIGS. 7–8, in the form of a segmented, multi-container embodiment.

Referring now to FIG. 9, the feed support means may comprise an alternative feed container 12a including a segmented array of receptacles 46 as shown. More specifically, the side walls 32 include interior surfaces 48, and at least one partition wall 50 extends between first and second portions 48a–b of the interior surfaces 48 sufficient to divide the container into a plurality of the receptacles 46, such that each receptacle is configured for holding edible items therein. As shown in FIG. 6, the feed container 15a may comprise three distinct receptacles 46 formed by the side walls 32 and two partition walls 50.

Referring now to FIG. 6, the feed support means may further alternatively comprise a bottle holder 52 configured for holding a feeding bottle 54 as shown, the feeding bottle 54 having a front end portion designated generally at 58 and a rear end portion designated generally at 48. The bottle holder 52 preferably comprises a main support body 60 configured for supporting the feeding bottle 54 thereon, and preferably includes a front support member 62. The bottle holder 52 may also comprise a rear support member 64 as shown in phantom line in FIG. 6, such that the front and rear support members 62 and 64 extend upwardly from the support body 34 and are configured for engaging with the front and rear end portions 56 and 58 of the feeding bottle 54, respectively. A flexible bottle nipple 59 protrudes through a nipple aperture of the front support member 62.

The rear support member 64 preferably comprises multi-directional guiding surface means 66, 68 for contactably guiding the feeding bottle 54 into the bottle holder 52 responsive to the feeding bottle being pushed against the multi-directional guiding surface means. Preferably, the multi-directional guiding surface means includes a bottle stop 68 and a directional slide 66. When the bottle 54 is inserted into the bottle holder 52, the rear portion 58 is guided against the directional slide 66 to slide conveniently in position against the bottle stop 68 so that the bottle 54 is conveniently wedged into the holder 52, instead of being abruptly levered into a rack as in conventional, prior art bottle holders. In this manner, the directional slide 66 has an effect similar to a shoe horn.

The multi-directional guiding surface means 66,68 is described in more general terms as a first guiding surface 68 extending upwardly from the support body 60 so as to face the front support member 62, and a second guiding surface 66 extending upwardly from the first guiding surface 68 at a nonstraight angle relative to the first guiding surface such that the second guiding surface extends in a direction away from said front support member 62. The second guiding surface 66 forms a junction 69 with the first guiding surface 68.

A suitable bottle gripping means is coupled to the support body 60 for gripping the feeding bottle 54, the bottle gripping means preferably including first and second opposing support legs 70 and 72 extending in a direction away from the front support member 62 and terminating in distal ends 74. The support legs 70 and 72 are configured and dimensioned to grip the rear end portion 58 of the feeding bottle 54 between them when the front portion 56 of the feeding bottle is being supported by the front support member 62. The distal ends 74 comprise retaining means respectively coupled to the first and second support legs 70 and 72 which extend inwardly between the support legs for abutting against the rear end portion 58 of the feeding bottle 54.

The support legs 70 and 72 are preferably resilient and respectively include proximal ends 76, and middle sections 78. The support legs 70 and 72 are coupled at their proximal ends 76 to opposing sides of the front support member 62 and extend toward the rear end 80 of the main support body 60. It is to be understood that although the support legs 70 and 72 as shown in FIG. 6 extend parallel to the support body 60 and the rear end 60, they are also "extending toward" the rear end 80 as that phrase is intended herein, even though they are not pointing directly toward the rear end 80.

First and second side support arms 82 and 84 extend upwardly from the main support body 60 transversely with respect to the support legs 70 and 72 and are respectively coupled to the middle sections 78 of the support legs. The side support arms 82 and 84 preferably include retaining knobs 86, as do the distal ends 74 of the support legs 70 and 72.

The configuration of FIG. 6 provides a number of advantages, because the intersection between the support legs and the side support arms may operate as lever points to induce the proximal ends 76 to flex inwardly against the front portion 56 of the bottle 54 in a firm grip, responsive to the rear end 58 of the feeding bottle forcing the distal ends 74 outwardly. Stated another way, if the distal ends 74 and their connecting portions are spaced apart less than the width of the bottle 54 at its rear end portion 58 when in their natural unbiased positions, the proximal portions 76 of the support arms 70 and 72 will be forced inwardly toward each other in a lever-type action responsive to the rear end portion 58 of the bottle 54 forcing the distal ends 74 outwardly. The support legs 70 and 72 may thus be configured and dimensioned to grip the front portion 56 of the bottle 54 when forced inwardly, such that the distal ends 74 and the proximal ends 76 cooperatively engage against the bottle 54 when it is placed between the support legs.

Referring now to FIGS. 1–5, the mounting bracket 16 and insert means 14 cooperatively comprise attachment means for attaching the feed container 12 to a support member 90 (FIG. 2). The feed container 12 extends outwardly from the attachment means 14, 16 in an at least partially cantilevered position. The feeding apparatus further comprises a sliding cover means 92 for (i) engaging in a slidable, interlocking fit with the feed container 12 such that said sliding cover means 92 is slidable back and forth in a linear, reciprocating manner over the upper opening 34 of said feed container 12 between first and second linearly-displaced positions shown in FIGS. 3 and 1, respectively, and (ii) at least partially covering the upper opening 34 of said feed container 12.

Figure 5:
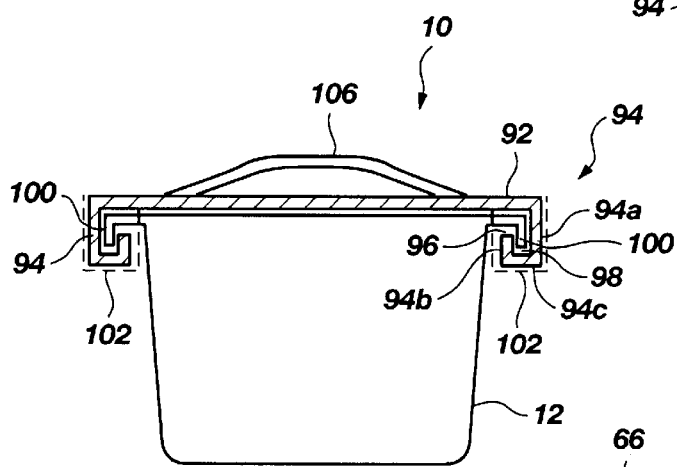
FIG. 5 is a rear view of the feed container of FIGS. 1 and 3.

The sliding cover means 92 includes at least one flange member 94, and preferably two, each having a U-shaped cross section as shown most clearly in FIG. 5. The cover means 92 preferably comprises a lid body having upper and lower opposing surfaces, and the flange members 94 comprise retaining means disposed on the lower surface of the lid body for retaining said lid body upon the feed container 12.

Referring to FIG. 5, each retaining means 94 comprises a first sidewall 94a having first and second opposing edges and being coupled at its first edge to the lower surface of the lid body 92 and extending outwardly therefrom, and a second sidewall 94b, and a third sidewall 94c intercoupling the second sidewall to the first sidewall such that said first and second sidewalls extend in a substantially parallel orientation. The second sidewall 94b and the lid body 92 cooperatively define an elongate gap 96 therebetween. The first and second intercoupled sidewalls 94a and 94b are spaced apart so as to define an elongate receiving space 98 therebetween which communicates with the elongate gap 96. Preferably, the third sidewall 94c is coupled at substantially right-angles to the first and second sidewalls 94a and 94b, respectively, such that the first, second and third sidewall cooperatively form a rectangular cross-sectional shape.

The feed container 12 includes at least one projecting lip 100 extending outwardly therefrom, said lip comprising at least two sidewalls defining a nonstraight angle therebetween. The lip 100 is sufficiently dimensioned and positioned to extend through the elongate gap 96 and into the receiving space 98 of the retaining means 94 when the cover means 92 is at least partially covering the upper opening 34 of the feed container 12. The lips 100 are thereby simultaneously engaged within the elongate receiving spaces 98 of the first and second retaining means 94, respectively. The sidewalls defining the projecting lips 100 preferably define a substantially right angle therebetween, as shown. The projecting lips 100 operates as a tongue member for enabling reciprocating, sliding movement of the cover means 92 along the lips 100 in a linear movement path.

The feeding apparatus 10 further comprises blocking means 102, shown in FIG. 1 and in phantom line in FIG. 5, for blocking sliding movement of the cover means 92 along the feed container 12 in a first sliding direction shown by arrow 104 in FIG. 1 beyond a predetermined position of said cover means with respect to the feed container 12, said predetermined position being shown as a closed position in FIG. 1. The blocking means 102 preferably comprises a wall member attached to the cover means 92 in alignment with a central axis of the retaining means 94 for engaging in abutting contact with the lips 100 of the feed container 12 when the cover means 92 arrives at the predetermined position as in FIG. 1, thereby preventing further movement of the cover means 92 relative to the feed container 12 in the first sliding direction 104. The blocking means 102 may thus comprise barrier means which resides closer to a proximal end 104 of the channel member than the distal end 106.

The cover means 92 may include a handle means 106 coupled to the upper surface thereof for being gripped by a user to enable said user to carry the feeding apparatus 10. The sliding cover means 92 may comprises a continuous cover member which is larger in shape and dimension than that upper opening 34 of the feed container such that said cover member closes off said upper opening when in the second linearly-displaced position, as shown in FIG. 1.

Figure 4:
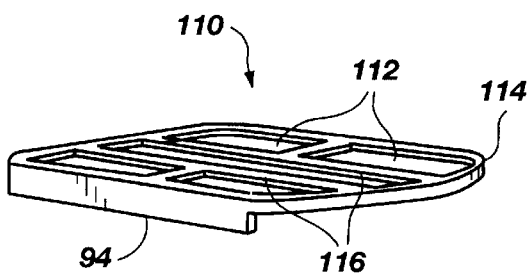
FIG. 4 is a perspective view of an alternative embodiment of a cover portion of the feed container of FIGS. 1 and 3, in the form of a slidably interlockable creep feeder cage.

Alternatively, the sliding cover means may comprise a creep feeder cage 110 as in FIG. 4. The cage 110 comprises a plurality of openings 112, each said opening having a dimensional area which is less than half a dimensional area of the upper opening 34 of the feed container 12. The cage 110 comprises a perimeter frame 114 defining an interior opening as shown and a plurality of grid members 116 secured to the frame 114 and extending into the opening. The cage 110 preferably includes the retaining means 94, as described above in conjunction with the cover 92 of FIG. 5.

A preferred method for containing edible items includes the steps of:

(a) placing the edible items into a container 12 having an upper opening 34 and a lip member 100 extending outwardly therefrom, said container 12 further comprising front and rear ends and an insert member 14 disposed on said rear end;

(b) sliding a cover member 92 having an elongate retaining channel 94 onto the rear end of the container 12 and over the upper opening 34 of the container;

(c) sliding the lip 100 of the container 12 into said retaining channel 94 such that said retaining channel 94 is slidably interlocked around said lip 100; and (d) sliding the insert member 14 of the container 12 into a receiving space 18 of a mounting bracket 16 such that the container 12 is suspended from the mounting bracket 16 in an at least partially cantilevered position.

The method described above may be further enhanced with the step of:

(e) attaching a blocking means 102 to either the container 12 or the cover member 92 for blocking sliding movement of the cover member 92 along the container 12 in a first sliding direction 104 beyond a predetermined position of said cover member 92 with respect to the container 12.

The method described above may be further enhanced in that step (d) may further comprise sliding the insert member 14 into a mounting bracket 16 coupled to an interior location upon a wall 90 when the cover member 92 is positioned over the upper opening 34 of the container 12 such that said cover 92 is blocked from sliding off the container 12 until removal of the insert member 14 from the mounting bracket 16.

The feeding apparatus 10 provides many advantages. When the apparatus 10 is secured in the mounting bracket 16 upon a wall 90, which might for example be a portable transport trailer, the cover 92 is lodged in place and cannot be removed from the container 12 until the container 12 is removed from the mounting bracket 16. The blocking walls 102 prevent livestock from bunting the cover 92 off from the container 12. The cover 92 is utilized to prevent access by any livestock, and the creep feeder cage is utilized to permit access by younger livestock whose muzzles can fit between the grid members 116.

The one-piece unibody nature of the container 12 is preferably achieved by utilization of injection molding processes known in the art. When a suitable polymeric material is used to mold the container 12, the entire feeding apparatus 10 is thereby rendered flexibly resilient with elastic memory. This is highly advantageous, because the cattle tend to bunt against the feeding apparatus with tremendous force. The resilient feeding apparatus 10 is less likely to become broken from such bunting, as opposed to the structurally rigid prior art feed buckets which are less capable of absorbing the tremendous bunting forces.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A feeding apparatus comprising:

feed support means for supporting edible items;

a mounting bracket having a receiving space defined by sidewalls, said mounting bracket including attachment means for attaching to a support member; and insert means disposed on the feed support means for (i) slidably inserting into the receiving space of the mounting bracket, (ii) engaging against the sidewalls defining said receiving space, and (iii) supporting the feed support means in hanging suspension from the mounting bracket;

wherein the receiving space includes an entrance and wherein every portion of said receiving space except said entrance is encapsulated by the sidewalls, said sidewalls comprising a first side and an opposing second side and two opposing spacing walls disposed between the first and second sides and a bottom wall disposed beneath the first and second sides and the spacing walls, wherein each of said first side, second side, spacing walls and bottom wall is characterized by an absence of an opening formed therein;

wherein the insert means and the receiving space are cooperatively configured and dimensioned such that said insert means is capable of engaging simultaneously against all of the first and second sides and the two opposing spacing walls and the bottom wall when insert means has been slidably inserted into the receiving space.

2. The feeding apparatus as defined in claim 1, wherein the feed support means extends laterally outward from the insert means in an at least partially cantilevered position.

3. The feeding apparatus as defined in claim 1, wherein the mounting bracket comprises a support plate and first and second retaining flanges having L-shaped cross-sections extending outwardly from the support plate.

4. The feeding apparatus as defined in claim 1, wherein the mounting bracket further comprises first and second, substantially parallel sides, said sides being spaced apart, and first and second spaced-apart spacing walls residing between the first and second sides, said sides and spacing walls cooperatively defining the receiving space.

5. The feeding apparatus as defined in claim 1, wherein the feed support means comprises a feed container having an upper opening.

6. The feeding apparatus as defined in claim 1, wherein the feed support means comprises means for exposing said edible items to atmosphere such that said edible items are accessible to humans and animals.

7. A feeding apparatus comprising:

feed support means for supporting edible items;

a mounting bracket having a receiving space defined by sidewalls, said mounting bracket including attachment means for attaching to a support member;

insert means disposed on the feed support means for (i) slidably inserting into the receiving space of the mounting bracket, (ii) engaging against at least some of the sidewalls defining said receiving space, and (iii) supporting the feed support means in hanging suspension from the mounting bracket;

wherein the mounting bracket further comprises first and second, substantially parallel sides, said sides being spaced apart, and first and second spaced-apart spacing walls residing between the first and second sides, said sides and spacing walls cooperatively defining the receiving space;

wherein the second side of the mounting bracket includes an opening formed therein such that said second side forms a discontinuous member comprising first and second retaining flanges extending toward one another from the spacing walls, such that the mounting bracket comprises means for circumscribing a majority of the insert means.

8. The feeding apparatus as defined in claim 7, wherein the insert means comprises a substantially flat, planer member, and wherein the receiving space has a rectangular shape.

9. The feeding apparatus as defined in claim 8, wherein the insert means further comprises a connecting member which is narrower than the planer member and which is sandwiched between said planer member and the feed support means.

10. The feeding apparatus as defined in claim 9, wherein the feed support means comprises an outer wall, the connecting member being sandwiched between the planer member and said outer wall such that said planer member, connecting member and outer wall collectively comprise an I-shaped cross section.

11. The feeding apparatus as defined in claim 10, wherein the mounting bracket further comprises a lower support surface defining a lowermost boundary of the receiving space, said lower support surface being disposed in alignment with the planer member and the connecting member of the insert means when said insert means is slidably inserted into said receiving space.

12. The feeding apparatus as defined in claim 11, wherein the insert means comprises means for abutting against the lower support surface of the mounting bracket.

13. The feeding apparatus as defined in claim 10, wherein the first and second retaining flanges respectively comprise first and second terminal edges, the connecting member being substantially as wide as the opening formed in the second side of the mounting bracket such that said connecting member is disposed in abutting contact with said first and second terminal edges of the retaining flanges when the insert means is slidably inserted into the receiving space.

14. A feeding apparatus comprising:

feed support means for supporting edible items;

a mounting bracket having a receiving space defined by sidewalls, said mounting bracket including attachment means for attaching to a support member;

insert means disposed on the feed support means for (i) slidably inserting into the receiving space of the mounting bracket, (ii) engaging against at least some of the sidewalls defining said receiving space, and (iii) supporting the feed support means in hanging suspension from the mounting bracket;

wherein the feed support means comprises a bottle holder, said bottle holder comprising:

a main support body having a front end and a rear end, said support body being configured for supporting thereon a feeding bottle having a front portion and a rear end portion;

a front support member coupled to the main support body and being configured for supporting the front portion of the feeding bottle;

bottle gripping means coupled to the support body for gripping the feeding bottle, said bottle gripping means including first and second opposing support legs extending in a direction away from the front support member and terminating in distal ends, said support legs being configured and dimensioned to grip the rear end portion of the feeding bottle between them when the front portion of the feeding bottle is being supported by the front support member; and mounting means coupled to the main support body for mounting said support body upon a support structure.

15. The bottle holder as defined in claim 14, wherein the distal ends of the support legs are spaced apart by a distance which is less than a width of the rear end portion of the feeding bottle.

16. The bottle holder as defined in claim 14, wherein the support legs are resilient and each include a proximal end and a middle section, said support legs being coupled at their proximal ends to opposing sides of the front support member and extending toward the rear end of the main support body, wherein the bottle gripping means further comprises first and second side support arms extending upwardly from the main support body transversely with respect to the support legs and being respectively coupled to the middle sections of the first and second support legs.

17. The bottle holder as defined in claim 16, wherein the bottle gripping means further comprises first and second retaining means respectively coupled to the first and second support legs and extending inwardly between said support legs for abutting against the rear end portion of the feeding bottle.

18. The bottle holder as defined in claim 14, wherein the mounting means comprises gripping means coupled to the main support body for releasably gripping a support edge, wherein said gripping means includes first and second opposing walls intercoupled so as to define a space therebetween and a moveable surface coupled to at least one of the walls and being moveable relative to said walls.

19. The bottle holder as defined in claim 14, further comprising:
   multi-directional guiding surface means coupled to the rear end of the main support body for contactably guiding the feeding bottle into the bottle holder responsive to said feeding bottle being pushed against said multi-directional guiding surface means.

20. A feeding apparatus comprising:
   a feed container having an upper opening;
   attachment means for attaching the feed container to a support member;
   sliding cover means for (i) engaging in a slidable, interlocking fit with the feed container such that said sliding cover means is slidable back and forth in a linear, reciprocating manner over the upper opening of said feed container between first and second linearly-displaced positions, respectively, and (ii) at least partially covering the upper opening of said feed containers;
   wherein the sliding cover means comprises:
   a lid body having upper and lower opposing surfaces; and
   retaining means disposed on the lower surface of the lid body for retaining said lid body upon the feed container, said retaining means comprising first and second intercoupled sidewalls, said second sidewall being narrower than said first sidewall and extending toward the lower surface of the lid body such that said lid body and said second sidewall cooperatively define an elongate gap therebetween, said first and second intercoupled sidewalls being spaced apart so as to define an elongate receiving space therebetween which communicates with the elongate gap, and wherein the feed container includes at least one projecting lip extending outwardly therefrom, said at least one lip comprising at least two sidewalls defining a nonstraight angle therebetween, said at least one lip being sufficiently dimensioned and positioned to extend through the elongate gap and into the receiving space of the retaining means when the cover means is at least partially covering the upper opening of the feed container.

21. A feeding apparatus as defined in claim 20, wherein the sliding cover means includes at least one flange member having a U-shaped cross section.

22. A feeding apparatus as defined in claim 20, wherein the retaining means comprises:
   a first sidewall having first and second opposing edges and being coupled at its first edge to the lower surface of the lid body and extending outwardly therefrom;
   a second sidewall, and a third sidewall intercoupling the second sidewall to the first sidewall such that said first and second sidewalls extend in a substantially parallel orientation.

23. A feeding apparatus as defined in claim 22, wherein the second sidewall extends from the third sidewall toward the lower surface of the lid body, and wherein the second sidewall and the lid body cooperatively define an elongate gap therebetween.

24. The feeding apparatus as defined in claim 22, wherein the third sidewall is coupled at substantially right-angles to the first and second sidewalls, respectively, such that the first, second and third sidewall cooperatively form a rectangular cross-sectional shape.

25. A feeding apparatus as defined in claim 20, wherein the retaining means comprises first and second elongate, spaced-apart retaining members disposed on the lower surface of the lid body, and wherein the at least one projecting lip comprises first and second spaced-apart lip members extending outwardly from opposing sides of the feed container, said lip members being positioned and arranged to enable simultaneous engagement thereof within the elongate receiving spaces of the first and second retaining means, respectively.

26. A feeding apparatus as defined in claim 20, wherein the sidewalls of the projecting lip define a substantially right angle therebetween.

27. A feeding apparatus as defined in claim 20, wherein the retaining means includes two opposing elongate sidewalls defining an open, elongate groove therebetween, and wherein the feed container includes a tongue member extending outwardly therefrom into the groove of the retaining means in such a manner to enable reciprocating, sliding movement of the cover means along the tongue member in a linear movement path.

28. A feeding apparatus as defined in claim 20, further comprising blocking means for blocking sliding movement of the cover means along the feed container in a first sliding direction beyond a predetermined position of said cover means with respect to the feed container.

29. The feeding apparatus as defined in claim 20, further comprising a handle means coupled to the upper surface of the lid body for being gripped by a user to enable said user to carry the feeding apparatus.

30. The feeding apparatus as defined in claim 20, wherein the feed container extends outwardly from the attachment means in an at least partially cantilevered position.

31. The feeding apparatus as defined in claim 20, wherein the first and second positions of the sliding cover means correspond to open and closed positions, respectively.

32. The feeding apparatus as defined in claim 20, wherein the sliding cover means comprises a continuous cover member which is larger in shape and dimension than the upper opening of the feed container such that said cover member closes off said upper opening when in the second linearly-displaced position.

33. The feeding apparatus as defined in claim 20, wherein the sliding cover means comprises a plurality of openings, at least some of said openings having a dimensional area which is less than half a dimensional area of the upper opening of the feed container.

34. The feeding apparatus as defined in claim 20, wherein the feed container further comprises a bottom wall and a front wall extending upwardly from said bottom wall at an obtuse angle relative to said bottom wall.

35. The feeding apparatus as defined in claim 34, wherein the obtuse angle is within a range of approximately 91 degrees to 150 degrees.

36. The feeding apparatus as defined in claim 34, wherein the obtuse angle is within a range of approximately 105 degrees to 120 degrees.

37. The feeding apparatus as defined in claim 34, wherein the feed container further comprises a rear wall and side walls extending upwardly from the bottom wall, and wherein the rear wall side walls each define an obtuse angle relative to said bottom wall.

38. The feeding apparatus as defined in claim 37, wherein the bottom wall forms rounded corner sections with the rear wall, side walls and front wall.

39. The feeding apparatus as defined in claim 20 wherein the feed container further comprises:
 a bottom wall;
 side walls extending upwardly from said bottom wall and having interior surfaces; and
 at least one partition wall extending between first and second portions of the interior surfaces of the side walls sufficient to divide the container into a plurality of receptacles, such that each receptacle is configured for holding edible items therein.

40. The feeding apparatus as defined in claim 39, wherein the feed container further comprises three distinct receptacles formed by the side walls and the at least one partition wall.

41. The feeding apparatus as defined in claim 20, further comprising:
 dispensing means disposed on the feed container for dispensing edible items from the feed container.

42. A feeding apparatus comprising:
 a feed container having an upper opening;
 attachment means for attaching the feed container to a support member;
 sliding cover means for (i) engaging in a slidable, interlocking fit with the feed container such that said sliding cover means is slidable back and forth in a linear, reciprocating manner over the upper opening of said feed container between first and second linearly-displaced positions, respectively, and (ii) at least partially covering the upper opening of said feed container; and
 blocking means disposed in a substantially fixed orientation with respect to the retaining means, for blocking sliding movement of the cover means along the feed container in a first sliding direction beyond a predetermined position of said cover means with respect to the feed container;
 wherein the sliding cover means comprises:
 a lid body having upper and lower opposing surfaces; and
 retaining means disposed on the lower surface of the lid body for retaining said lid body upon the feed container.

43. A feeding apparatus comprising:
 a feed container having an upper opening;
 attachment means for attaching the feed container to a support member;
 sliding cover means for (i) engaging in a slidable, interlocking fit with the feed container such that said sliding cover means is slidable back and forth in a linear, reciprocating manner over the upper opening of said feed container between first and second linearly-displaced positions, respectively, and (ii) at least partially covering the upper opening of said feed container;
 blocking means disposed in a substantially fixed orientation with respect to the retaining means, for blocking sliding movement of the cover means alone the feed container in a first sliding direction beyond a predetermined position of said cover means with respect to the feed container;
 wherein the sliding cover means comprises:
 a lid body having upper and lower opposing surfaces; and
 retaining means disposed on the lower surface of the lid body for retaining said lid body upon the feed container, said retaining means comprising at least one channel member defining a central axis and having proximal and distal ends, and wherein the blocking means comprises barrier means coupled to the lid body in alignment with the central axis of the at least one channel member for engaging in abutting contact with the feed container when the cover means arrives at the predetermined position and thereby preventing further movement of the cover means relative to the feed container in the first sliding direction.

44. The feeding apparatus as defined in claim 43, wherein the barrier means resides closer to the proximal end of the at least one channel member than the distal end.

45. The feeding apparatus as defined in claim 43, wherein the barrier means comprises a blocking wall coupled to the proximal end of the at least one channel member.

46. A feeding apparatus comprising:
 a feed container having an upper opening;
 attachment means for attaching the feed container to a support member;
 sliding cover means for (i) engaging in a slidable, interlocking fit with the feed container such that said sliding cover means is slidable back and forth in a linear, reciprocating manner over the upper opening of said feed container between first and second linearly-displaced positions, respectively, and (ii) at least partially covering the upper opening of said feed container;
 wherein the sliding cover means comprises a plurality of openings, at least some of said openings having a dimensional area which is less than half a dimensional area of the upper opening of the feed container;
 wherein the sliding cover means further comprises a perimeter frame defining an interior opening and a plurality of grid members secured to the frame and extending into said interior opening.

47. A feeding apparatus comprising:
 a feed container having an upper opening;
 attachment means for attaching the feed container to a support member;
 sliding cover means for (i) engaging in a slidable, interlocking fit with the feed container such that said sliding cover means is slidable back and forth in a linear, reciprocating manner over the upper opening of said feed container between first and second linearly-displaced positions, respectively, and (ii) at least partially covering the upper opening of said feed container;
 dispensing means disposed on the feed container for dispensing edible items from the feed container, wherein the dispensing means comprises a flexible nipple member.

48. A feeding apparatus comprising:
 a feed container having an upper opening;
 attachment means for attaching the feed container to a support member, wherein the feed container extends outwardly from the attachment means in an at least partially cantilevered position;

sliding cover means for (i) engaging in a slidable, interlocking fit with the feed container such that said sliding cover means is slidable back and forth in a linear, reciprocating manner over the upper opening of said feed container between first and second linearly-displaced positions, respectively, and (ii) at least partially covering the upper opening of said feed container, wherein the first and second positions of the sliding cover means correspond to open and closed positions, respectively;

wherein the sliding cover means comprises:

a continuous lid body having upper and lower opposing surfaces and being larger in shape and dimension than the upper opening of the feed container such that said cover member closes off said upper opening when in the second linearly-displaced position; and first and second retaining means disposed on the lower surface of the lid body for retaining said lid body upon the feed container, wherein each retaining means comprises first and second intercoupled sidewalls, said second sidewall being narrower than said first sidewall and extending toward the lower surface of the lid body such that said lid body and said second sidewall cooperatively define an elongate gap therebetween, said first and second intercoupled sidewalls being spaced apart so as to define an elongate receiving space therebetween which communicates with the elongate gap, and wherein the feed container includes at least one projecting lip extending outwardly therefrom, said at least one lip comprising at least two sidewalls defining a nonstraight angle therebetween, said at least one lip being sufficiently dimensioned and positioned to extend through the elongate gap and into the receiving space of the retaining means when the cover means is at least partially covering the upper opening of the feed container;

wherein the sidewalls of the at least one projecting lip define a substantially right angle therebetween;

blocking means disposed in a substantially fixed orientation with respect to the retaining means, for blocking sliding movement of the cover means along the feed container in a first sliding direction beyond a predetermined position of said cover means with respect to the feed container;

wherein the retaining means comprises at least one channel member defining a central axis and having proximal and distal ends, and wherein the blocking means comprises barrier means coupled to the lid body in alignment with the central axis of the at least one channel member for engaging in abutting contact with the feed container when the cover means arrives at the predetermined position and thereby preventing further movement of the cover means relative to the feed container in the first sliding direction;

wherein the barrier means resides closer to the proximal end of the at least one channel member than the distal end;

wherein the barrier means comprises a blocking wall coupled to the proximal end of the at least one channel member;

wherein the third sidewall is coupled at substantially right-angles to the first and second sidewalls, respectively, such that the first, second and third sidewall cooperatively form a rectangular cross-sectional shape;

a handle means coupled to the upper surface of the lid body for being gripped by a user to enable said user to carry the feeding apparatus;

wherein the feed container further comprises a bottom wall and a front wall extending upwardly from said bottom wall at an obtuse angle relative to said bottom wall, said obtuse angle being within a range of approximately 91 degrees to 150 degrees;

wherein the feed container further comprises a rear wall and side walls extending upwardly from the bottom wall, and wherein the rear wall side walls each define an obtuse angle relative to said bottom wall;

wherein the bottom wall forms rounded corner sections with the rear wall, side walls and front wall;

a mounting bracket having a receiving space defined by sidewalls, said mounting bracket including attachment means for attaching to a support member;

insert means disposed on the feed container for (i) slidably inserting into the receiving space of the mounting bracket, (ii) engaging against the sidewalls defining said receiving space, and (iii) supporting the feed container in hanging suspension from the mounting bracket;

wherein the mounting bracket has a cross-section comprising first and second, substantially parallel sides, said sides being spaced apart, and first and second spaced-apart spacing walls residing between the first and second sides, said sides and spacing walls cooperatively defining the receiving space;

wherein the second side of the mounting bracket includes an opening formed therein such that said second side forms a discontinuous member comprising first and second retaining flanges extending toward one another from the spacing walls, such that the mounting bracket comprises means for circumscribing a majority of the insert means;

wherein the insert means comprises a substantially flat, rectangular member, and wherein the receiving space has a rectangular shape.

49. The feeding apparatus as defined in claim 48, further comprising:

dispensing means disposed on the feed container for dispensing edible items from the feed container, said dispensing means comprising a flexible nipple member.

50. The feeding apparatus as defined in claim 48, wherein the insert means further comprises a connecting member which is narrower than the planer member and which is sandwiched between said planer member and the feed support means;

wherein the feed support means comprises an outer wall, the connecting member being sandwiched between the planer member and said outer wall such that said planer member, connecting member and outer wall collectively comprise an I-shaped cross section;

wherein the mounting bracket further comprises a lower support surface defining a lowermost boundary of the receiving space, said lower support surface being disposed in alignment with the planer member and the connecting member of the insert means when said insert means is slidably inserted into said receiving space;

wherein the insert means comprises means for abutting against the lower support surface of the mounting bracket;

wherein the first and second retaining flanges respectively comprise first and second terminal edges, the connecting member being substantially as wide as the opening formed in the second side of the mounting bracket such that said connecting member is disposed in abutting contact with said first and second terminal edges of the retaining flanges when the insert means is slidably inserted into the receiving space.

51. A method for containing edible items comprising the steps of:

(a) placing the edible items into a container having an upper opening and a lip member extending outwardly therefrom, said container further comprising front and rear ends and an insert member disposed on said rear end;

(b) sliding a cover member having an elongate retaining channel onto the rear end of the container and over the upper opening of the container;

(c) sliding the lip of the container into said retaining channel such that said retaining channel is slidably interlocked around said lip; and (d) sliding the insert member of the container into a receiving space of a mounting bracket such that the container is suspended from the mounting bracket in an at least partially cantilevered position;

wherein step (d) further comprises sliding the insert member into a mounting bracket coupled to an interior location upon a wall when the cover member is positioned over the upper opening of the container such that said cover is blocked from sliding off the container until removal of the insert member from the mounting bracket.

52. The method as defined in claim 51, further comprising the step of:

(e) attaching a blocking means to either the container or the cover member for blocking sliding movement of the cover member along the container in a first sliding direction beyond a predetermined position of said cover member with respect to the container.

* * * * *